US007936962B2

(12) United States Patent
Mudd et al.

(10) Patent No.: US 7,936,962 B2
(45) Date of Patent: *May 3, 2011

(54) HIGH DENSITY OPTICAL FIBER DISTRIBUTION ENCLOSURE

(75) Inventors: Ronald L. Mudd, Coppell, TX (US); Daniel S. McGranahan, Ft. Worth, TX (US); Guy Castonguay, Ft. Worth, TX (US); Antwan J. Works, Lewisville, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,458

(22) Filed: Apr. 12, 2010

(65) Prior Publication Data

US 2010/0195970 A1    Aug. 5, 2010

Related U.S. Application Data

(63) Continuation of application No. 11/432,570, filed on May 11, 2006, now Pat. No. 7,702,208.

(51) Int. Cl.
*G02B 6/36* (2006.01)

(52) U.S. Cl. .......................................... 385/135; 385/53

(58) Field of Classification Search .................... 385/53, 385/135
See application file for complete search history.

(56) References Cited

U.S. PATENT DOCUMENTS

| 4,360,268 A | 11/1982 | Zucker et al. | 356/73.1 |
| 4,708,476 A | 11/1987 | So et al. | 356/73.1 |
| 4,958,900 A | 9/1990 | Ortiz, Jr. | 350/96.18 |
| 5,050,949 A | 9/1991 | DiGiovanni et al. | 359/341 |
| 5,259,047 A | 11/1993 | Morrison et al. | 385/27 |

(Continued)

FOREIGN PATENT DOCUMENTS

JP       62-27312       2/1987

(Continued)

OTHER PUBLICATIONS

International Telecommunication Union, ITU-T G.652, Telecommunication Standardization Sector of ITU, Jun. 2005, Series G: Transmission Systems and Media, Digital Systems and Networks, Transmission media characteristics—Optical fibre cables, Characteristics of a single-mode optical fibre and cable, ITU-T Recommendation G.652, 22 pgs.

(Continued)

*Primary Examiner* — Charlie Peng
*Assistant Examiner* — Peter Radkowski
(74) *Attorney, Agent, or Firm* — Christopher Paul Lewallen (57) ABSTRACT

An optical fiber distribution enclosure includes a housing defining an interior, a first fiber distribution area disposed within an upper portion of the interior, a second fiber distribution area disposed within a lower portion of the interior and a signal splitting area disposed between the fiber distribution areas. A splitter module secured within the signal splitting area has a connectorized splitter input optical fiber and connectorized splitter output optical fibers. A fiber parking area is movably disposed within the lower portion adjacent the second fiber distribution area for temporarily storing splitter output optical fibers that are not routed to the fiber distribution areas. An input fiber distribution area disposed within the interior interconnects an optical fiber of a feeder cable with the splitter input optical fiber. The splitter output optical fibers are eventually routed to a fiber distribution area and interconnected with a corresponding optical fiber of a distribution cable.

20 Claims, 6 Drawing Sheets

U.S. PATENT DOCUMENTS

| | | | |
|---|---|---|---|
| 5,260,957 A | 11/1993 | Hakimi et al. | 372/39 |
| 5,386,490 A | 1/1995 | Pan et al. | 385/134 |
| 5,640,482 A * | 6/1997 | Barry et al. | 385/135 |
| 5,867,621 A | 2/1999 | Luther et al. | 385/59 |
| 5,881,200 A | 3/1999 | Burt | 385/142 |
| 5,946,440 A | 8/1999 | Puetz | 385/135 |
| 6,049,413 A | 4/2000 | Taylor et al. | 359/337 |
| 6,160,946 A | 12/2000 | Thompson et al. | 385/134 |
| 6,206,583 B1 | 3/2001 | Hishikawa et al. | 385/96 |
| 6,259,851 B1 | 7/2001 | Daoud | 385/135 |
| 6,278,829 B1 | 8/2001 | BuAbbud et al. | 385/135 |
| 6,363,200 B1 | 3/2002 | Thompson et al. | 385/135 |
| 6,369,883 B1 | 4/2002 | Clark | 356/73.1 |
| 6,441,944 B1 | 8/2002 | Kim et al. | 359/281 |
| 6,487,336 B1 | 11/2002 | Yao | 385/24 |
| 6,535,579 B1 | 3/2003 | Blake et al. | 379/22.06 |
| 6,535,682 B1 | 3/2003 | Puetz et al. | 385/135 |
| 6,539,160 B2 | 3/2003 | Battey et al. | 385/135 |
| 6,556,763 B1 | 4/2003 | Puetz et al. | 385/135 |
| 6,577,801 B2 | 6/2003 | Broderick et al. | 385/125 |
| 6,614,665 B2 | 9/2003 | Witty et al. | 361/826 |
| 6,628,870 B2 | 9/2003 | Yamaguchi | 385/123 |
| 6,650,458 B1 | 11/2003 | Prosyk et al. | 359/276 |
| 6,710,366 B1 | 3/2004 | Lee et al. | 257/14 |
| 6,711,337 B2 | 3/2004 | Hodge et al. | 385/135 |
| 6,711,340 B2 | 3/2004 | Dickson | 385/140 |
| 6,721,507 B2 | 4/2004 | Iwata et al. | 398/79 |
| 6,760,531 B1 | 7/2004 | Solheid et al. | 385/135 |
| 6,766,094 B2 | 7/2004 | Smith et al. | 385/135 |
| 6,778,752 B2 | 8/2004 | Laporte et al. | 385/135 |
| 6,782,209 B2 | 8/2004 | Copeland et al. | 398/157 |
| 6,792,191 B1 | 9/2004 | Clapp, Jr. et al. | 385/135 |
| 6,795,552 B1 | 9/2004 | Stanush et al. | 379/413.01 |
| 6,804,352 B2 | 10/2004 | Miller et al. | 379/413.04 |
| 6,815,612 B2 | 11/2004 | Bloodworth et al. | 174/50 |
| 6,863,446 B2 | 3/2005 | Ngo | 385/72 |
| 6,920,274 B2 | 7/2005 | Rapp et al. | 385/135 |
| 6,934,433 B2 | 8/2005 | Miyata et al. | 385/16 |
| 6,968,107 B2 | 11/2005 | Belardi et al. | 385/127 |
| 6,980,725 B1 | 12/2005 | Swieconek | 385/135 |
| 6,983,095 B2 | 1/2006 | Reagan et al. | 385/135 |
| 7,054,513 B2 | 5/2006 | Herz et al. | 385/12 |
| 7,088,899 B2 | 8/2006 | Reagan et al. | 385/135 |
| 7,103,255 B2 | 9/2006 | Reagan et al. | 385/135 |
| 7,142,764 B2 | 11/2006 | Allen et al. | 385/135 |
| 7,149,398 B2 | 12/2006 | Solheid et al. | 385/135 |
| 7,171,100 B2 | 1/2007 | Solheid et al. | 385/135 |
| 7,200,317 B2 * | 4/2007 | Reagan et al. | 385/139 |
| 7,218,827 B2 | 5/2007 | Vongseng et al. | 385/135 |
| 7,218,828 B2 | 5/2007 | Feustel et al. | 385/135 |
| 7,257,223 B2 | 8/2007 | Sajadi et al. | 379/413.04 |
| 7,274,850 B2 | 9/2007 | Wittmeier et al. | 385/135 |
| 7,277,620 B2 | 10/2007 | Vongseng et al. | 385/135 |
| 7,333,707 B2 | 2/2008 | Puetz et al. | 385/135 |
| 7,362,925 B2 | 4/2008 | Miyata et al. | 385/14 |
| 7,400,816 B2 | 7/2008 | Reagan et al. | 385/139 |
| 2002/0051616 A1 | 5/2002 | Battey et al. | 385/135 |
| 2002/0181925 A1 | 12/2002 | Hodge et al. | 385/135 |
| 2003/0223725 A1 | 12/2003 | Laporte et al. | 385/135 |
| 2004/0146266 A1 | 7/2004 | Solheid et al. | 385/135 |
| 2004/0228598 A1 | 11/2004 | Allen et al. | 385/135 |
| 2005/0002633 A1 | 1/2005 | Solheid et al. | 385/135 |
| 2005/0021392 A1 | 1/2005 | English et al. | 705/12 |
| 2005/0025444 A1 | 2/2005 | Barnes et al. | 385/135 |
| 2005/0053337 A1 | 3/2005 | Mayer | 385/89 |
| 2005/0100301 A1 | 5/2005 | Solheid et al. | 385/135 |
| 2005/0105873 A1 | 5/2005 | Reagan et al. | 385/135 |
| 2005/0129379 A1 | 6/2005 | Reagan et al. | 385/135 |
| 2005/0135768 A1 | 6/2005 | Rapp et al. | 385/135 |
| 2005/0213921 A1 | 9/2005 | Mertesdorf et al. | 385/135 |
| 2005/0281526 A1 | 12/2005 | Vongseng et al. | 385/135 |
| 2006/0008231 A1 | 1/2006 | Reagan et al. | 385/135 |
| 2006/0029353 A1 | 2/2006 | Bolster et al. | 385/135 |
| 2006/0093302 A1 | 5/2006 | Solheid et al. | 385/135 |
| 2006/0093303 A1 | 5/2006 | Reagan et al. | 385/135 |
| 2006/0153517 A1 | 7/2006 | Reagan et al. | 385/135 |
| 2006/0233506 A1 | 10/2006 | Noonan et al. | 385/134 |
| 2006/0263029 A1 | 11/2006 | Mudd et al. | 385/135 |
| 2007/0031100 A1 | 2/2007 | Garcia et al. | 385/135 |
| 2007/0165995 A1 | 7/2007 | Reagan et al. | 385/135 |
| 2007/0192817 A1 | 8/2007 | Landry et al. | 725/119 |
| 2008/0075411 A1 | 3/2008 | Solheid et al. | 385/135 |

FOREIGN PATENT DOCUMENTS

| | | |
|---|---|---|
| JP | 1-182802 | 7/1989 |
| JP | 2005-338436 | 12/2005 |
| WO | WO 02/093215 A2 | 11/2002 |
| WO | WO2004/086112 A1 | 10/2004 |
| WO | WO2004/095107 A1 | 11/2004 |
| WO | WO2005/050277 A2 | 6/2005 |
| WO | WO2005/088373 A1 | 9/2005 |
| WO | WO2006/044080 A1 | 4/2006 |
| WO | WO2006/050505 A1 | 5/2006 |
| WO | WO2006/135524 A2 | 12/2006 |

OTHER PUBLICATIONS

International Telecommunication Union, ITU-T G.657, Telecommunication Standardization Sector of ITU, Dec. 2006, Series G: Transmission Systems and Media, Digital Systems and Networks, Transmission media and optical systems characteristics—Optical Fibre Cables, Characteristics of a bending loss insensitive single mode optical fibre and cable for the access network, ITU-T Recommendation G.657, 20 pgs.

Gibson et al., Evanescent Field Analysis of Air-Silica Microstructure Waveguides, IEEE, 0-7803-7105-4/01, 2001, pp. 709-710.

Monro et al., "Holey Fibers with random cladding distributions" Optic Letters, vol. 25, No. 4; Feb. 15,2000.

Pickrell et al., "Novel Techniques for the Fabrication of Holey Optical Fibers" Spie Conference Proceedings, vol. 4578, pp. 271-282; 2001.

PennWell Corporation, "Bringing Fiber to the multi-dwelling unit", reprinted with revisions to format, from the Oct. 2005 edition of Cabling Installation & Maintenance, Copyright 2005.

Corning Cable Systems LLC, Product Information Sheet, OptiTect™ Premier Local Convergence Cabinet, An Evolant © Solutions Product, Sep. 2006, 6 pages.

FONS, Fiber Optic Network Solutions, "Fiber Distribution Terminals", Fiber Access Terminals, Copyright © FONS Corp. 2005, www.fons.com, 3 pages.

FONS, Fiber Optic Network Solutions, "Indoor Fiber Distribution Terminal", "Interior Wall Mount Terminals", Copyright © FONS Corp. 2005, www.fons.com, 3 pages.

ADC Spec Sheet "OmniReach™ FTTX Solutions", "Outdoor Fiber Distribution Terminal 24 (OFDT-24)", 103335AE, Jan. 2007 Revision © 2006, 2007 www.adc.com, 4 pages.

ADC Spec Sheet "OmniReach™ FTTX Solutions", "Indoor Fiber Distribution Terminal", 103266AE, Aug. 2006 Revision © 2006 www.adc.com, 4 pages.

ADC Catalog "OmniReach™ FTTP Solutions", "Fiber Distribution Terminals", "FTTP Infrastructure Solutions", "Fiberglass In-Ground Mounting Sleeve", "Above Ground Cabinet Mounting", "Pad or Pole Mounting", "Accessories", 1276550 Apr. 2004, Revision © 2003, 2004 www.adc.com, 12 pages.

Emerson product sheet, "NetSpan™ Fiber Distribution Hub Fiber Cross-Connect Enclosure", "Outside Plant for Business Continuity", © 2006 Emerson Network Power Energy Systems, North America, www.EmersonNetworkPower.com/Energy Systems.Com, 2 pages.

SPC TelEquip product sheet, "FiberGard Distribution Terminal 48 Fiber-Indoor/Outdoor", "The compact solution for fiber provisioning", www.spc.net/2005/Fiber%/20Optics%20FiberGard%20Dist%20Term%2048.html.

Corning Cable Systems Product Specification Sheet, OptiSplice™ Premier iLID Fusion Splicer, Jun. 2004, 4 pages.

Corning Cable Systems Product Specification Sheet, Downloading Spice Data from M90, miniMASS®, and X7 Series Fusion Splicers, Sep. 2002, 3 pages.

JM Fiber Optics Inc. Product Index, Altima XMiniature Automatic Fusion Splicer, Apr. 22, 2004, 3 pages.

Sumitomo Electric Lightwave Corp. "Type 36 Single Fiber Fusion Splicer" 1998.

Wach, Patrick, PCT Search Report and Opinion including all therein cited references. Aug. 22, 2005.

Hitachi Cable Review No. 24 "Low-loss Holey Fiber", Aug. 2005, 5 pages.

Draka Comteq / Optical Fibre, Issue Date: Aug. 2006, Supercedes: -/-, "BendBright$^{vs}$ Single Mode Optical Fibre, Enhanced low macrobending sensitive, low water peak fibre, Product Type: G.652D, Coating Type: ColorLock™ and Natural", www.drakafibre.com | www.draka.com, 2 pages.

Tyco Electronics Product Sheets, FOSC DMARC Outside Plant Demarcation Point Closure, 2005, 2 pages.

\* cited by examiner

HIGH DENSITY OPTICAL FIBER DISTRIBUTION ENCLOSURE

CROSS REFERENCE TO RELATED APPLICATIONS

This application is a Continuation of U.S. application Ser. No. 11/432,570, filed on May 11, 2006, now U.S. Pat. No. 7,702,208, and entitled High Density Optical Fiber Distribution Enclosure, the entire contents of which are incorporated herein by reference.

BACKGROUND OF THE INVENTION

1. Field of the Invention

The present invention relates generally to an optical fiber distribution enclosure for use in a passive optical network (PON), and more particularly, to a high density optical fiber distribution enclosure for splitting an optical signal carried on an optical fiber of a feeder cable into multiple optical signals carried on a plurality of optical fibers of a distribution cable in the outside plant of a PON.

2. Technical Background

It is now well known to use an optical splitter or splitter module (sometimes also referred to as a coupler module) in the outside plant of a passive optical network (PON) to distribute a broadband optical communications signal from a service provider to multiple subscribers. In a typical PON, an optical fiber distribution enclosure, sometimes referred to as a fiber distribution hub (FDH), a fiber distribution terminal (FDT) or a local convergence cabinet (LCC), is positioned at a convenient location along a primary feeder cable to split the optical signal carried on an optical fiber of the feeder cable into multiple optical signals carried on a plurality of optical fibers of one or more distribution cables. An outdoor cabinet for interconnecting an optical fiber of a feeder cable with at least two optical fibers of a distribution cable at a local convergence point beyond the central office in a PON is shown and described in U.S. Pat. No. 6,792,191 assigned to Corning Cable Systems LLC of Hickory, N.C.

In the LLC described in the '191 patent, the feeder cable and the distribution cable are first routed into the cabinet and optical fibers of the feeder cable and the distribution cable are then spliced to a relatively short length of optical fiber having a connectorized end, referred to in the art as a "pigtail." Each pigtail of the feeder cable is then routed to an input fiber adapter provided on a coupler module mounted within the cabinet. Likewise, the pigtails of the distribution cable are routed to output fiber adapters provided on the coupler module. In this manner, the optical signal carried on an optical fiber of the feeder cable is split (i.e., divided) into multiple optical signals carried on different optical fibers of the distribution cable. In a particular example, eighteen (18) optical fibers of a feeder cable are each split into sixteen (16) optical fibers of a distribution cable utilizing 1×16 coupler modules. In another particular example, nine (9) optical fibers of a feeder cable are each split into thirty-two (32) optical fibers of a distribution cable utilizing 1×32 coupler modules. In either case, the corresponding optical fiber distribution cabinet is referred to as a "288-Fiber Capacity Fiber Distribution Hub (FDH)" because the optical connections between the feeder cable and the distribution cable(s) result in a maximum of 288 distribution cable optical fibers. While a 288-Fiber Capacity FDH is common, a cabinet resulting in any convenient number of distribution cable optical fibers is also possible, including for example, 144, 432, 576, etc.

Regardless of the number of optical connections, the optical fiber distribution enclosure functions as an interface between the service provider's optical network (e.g., the PON) and the optical fibers connecting the individual subscribers to the network. The enclosure ensures mechanical and environmental protection for the optical fibers, the optical connections, and the optical hardware and equipment located inside the cabinet, while at the same time providing convenient access to the optical connections for the service provider to establish or reconfigure service to the subscribers. In addition, the enclosure provides an organized routing and management system for the optical fibers, as well a point of access to verify the operation and integrity of the optical network. While existing enclosures (including the LLC described in the '191 patent) satisfy at least some of the above objectives, all function less than optimally in one or more of the desired attributes. In particular, none of the existing enclosures is configured to interconnect optical fibers of a pre-connectorized feeder cable stub with optical fibers of a pre-connectorized distribution cable stub in an outside plant enclosure with organized cable routing and management and easy and ready access to the optical connections between the connectorized optical fibers of the distribution cable and connectorized output optical fibers from a splitter module.

Furthermore, existing optical fiber distribution enclosures are typically suspended from a utility pole or mounted on a utility pad along a street of a neighborhood. The current demand, or the planned expansion, of the optical network requires the size of the distribution enclosure to be significantly reduced in order to at least maintain the existing aesthetics (sometimes referred to as "curb appeal"). At the same time, many new deployments of optical networks require the distribution enclosure to be buried underground for improved aesthetics. Obviously, the need for increased density of optical connections and the desire for at least similar or improved aesthetics are inherently at odds with one another. Accordingly, what is needed is a high density optical fiber distribution enclosure configured to interconnect a pre-connectorized optical fiber of a feeder cable with a plurality of pre-connectorized optical fibers of a distribution cable in a compact housing. What is further needed is such a distribution enclosure that also facilitates handling, installation, initial configuration, reconfiguration and testing, and which is scalable to accommodate an increasing number of optical connections as service is provided to additional subscribers. In particular, an optical fiber distribution enclosure is desired for a buried optical network to provide centralized splitting in a high density, environmentally sealed closure. As will be described in further detail hereinafter, the present invention provides these and other features and advantages, and thereby satisfies the heretofore unresolved need for a high density optical fiber distribution enclosure.

SUMMARY OF THE INVENTION

In one aspect, the invention provides an optical fiber distribution enclosure for splitting an optical signal carried on at least one optical fiber of a feeder cable into multiple optical signals carried on a plurality of optical fibers of a distribution cable. The enclosure includes a housing defining an interior, a first fiber distribution area disposed within an upper portion of the interior, and a second fiber distribution area disposed within a lower portion of the interior. The enclosure further includes a signal splitting area disposed within a center portion of the interior between the upper portion and the lower portion. The signal splitting area defines a splitter module storage compartment for receiving at least one splitter module configured for splitting an optical signal carried on at least one splitter input optical fiber into a plurality of optical signals carried on a corresponding plurality of splitter output optical fibers. The first fiber distribution area and the second fiber distribution area each has a fiber distribution field for optically connecting at least one splitter output optical fiber with a corresponding one of the plurality of optical fibers of the distribution cable.

The optical fiber distribution enclosure may further include a fiber parking area having a parking field for storing at least one splitter output optical fiber that is not routed to the first fiber distribution area or the second fiber distribution area. In a preferred embodiment, the housing defines a longitudinal axis and the fiber distribution field of each of the first fiber distribution area and the second fiber distribution area defines a first plane generally parallel to the longitudinal axis. In the same embodiment, the fiber parking field of the fiber parking area defines a second plane not generally parallel to the longitudinal axis. In a further embodiment, the fiber parking field is movable relative to the fiber distribution field of each of the first fiber distribution area and the second fiber distribution area to provide increased access to the fiber parking field. Preferably, the fiber parking field is movable in the direction of the second plane. As shown and described herein, the fiber parking area may be disposed within the interior of the housing adjacent the lower portion. The optical fiber distribution enclosure may further include an input fiber distribution area for optically connecting the at least one splitter input fiber with the at least one optical fiber of the feeder cable. As shown and described herein, the input fiber distribution area is disposed within the interior of the housing adjacent the lower portion. In order to further reduce the size of the optical fiber distribution enclosure, each of the splitter output optical fibers may be a pre-connectorized pigtail comprising a bend insensitive optical fiber and having a predetermined length. Finally, the housing may include a base and a cover that sealingly engages the base to protect the interior of the housing from adverse environmental effects. Accordingly, the optical fiber distribution enclosure may be a below grade closure for use in a buried optical network.

In another aspect, the invention is an optical fiber distribution enclosure including a housing defining an interior and a longitudinal axis. The enclosure further includes a first fiber distribution area disposed within the interior of the housing and having a first fiber distribution field for optically connecting at least one of a plurality of splitter output optical fibers with a corresponding one of a plurality of optical fibers of a distribution cable. The fiber distribution field defines a first plane generally parallel to the longitudinal axis. The enclosure further includes a fiber parking area disposed within the interior of the housing and having a fiber parking field for storing at least one unused splitter output optical fiber. The fiber parking field defines a second plane that is not generally parallel to the longitudinal axis. The fiber parking field may be movable relative to the first fiber distribution field of the first fiber distribution area in the direction of the second plane to provide increased access to the fiber parking field.

The optical fiber distribution enclosure may further include a second fiber distribution area disposed within the interior of the housing and having a second fiber distribution field for optically connecting at least one of the plurality of splitter output optical fibers with at a corresponding one of the plurality of optical fibers of the distribution cable. In a preferred embodiment, the optical fiber distribution enclosure further includes a signal splitting area disposed within the interior of the housing and having at least one splitter module for splitting an optical signal carried on at least one optical fiber of a feeder cable into a plurality of optical signals carried on a plurality of the splitter output optical fibers. As shown and described herein, the signal splitting area is disposed medially between the first fiber distribution field and the second fiber distribution field. In order to further reduce the size of the optical fiber distribution enclosure, each of the splitter output optical fibers may be a pre-connectorized pigtail having a predetermined length. Preferably, the optical fiber distribution enclosure further includes an input fiber distribution area for optically connecting at least one splitter input fiber with the at least one optical fiber of the feeder cable.

In yet another aspect, the invention is a closure for providing centralized splitting in an optical network including a base, a frame mounted on the base, and a cover enclosing the frame and in sealing engagement with the base to define an environmentally protected interior. The closure includes a signal splitting area disposed on the frame within the interior and having at least one splitter module for splitting an optical signal carried on at least one optical fiber of a feeder cable into a plurality of optical signals carried on a plurality of splitter output optical fibers. The closure further includes a first fiber distribution area disposed on the frame within the interior and having a first fiber distribution field for optically connecting at least one of the plurality of splitter output fibers with a corresponding one of a plurality of optical fibers of a distribution cable.

The closure may further include a second fiber distribution area disposed on the frame within the interior and having a second fiber distribution field for optically connecting at least one of the plurality of splitter output fibers with a corresponding one of the plurality of optical fibers of the distribution cable. As shown and described herein, the signal splitting area is disposed medially between the first fiber distribution area and the second fiber distribution area. In order to further reduce the size of the closure, each of the splitter output optical fibers may be a pre-connectorized pigtail having a predetermined length. In a preferred embodiment, the closure further includes a fiber parking area disposed on the frame within the interior and having a fiber parking field for storing at least one unused splitter output fiber. The first fiber distribution field of the first fiber distribution area defines a first plane, and the fiber parking field defines a second plane that is not parallel to the first plane.

Additional features and advantages of the invention are set forth in the detailed description which follows and will be readily apparent to those skilled in the art from that description, or will be readily recognized by practicing the invention as described in the detailed description, including the claims, and the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this written specification. The drawings illustrate various exemplary embodiments of the invention, and together with the detailed description, serve to explain the principles and operations thereof. Additionally, the drawings and descriptions are intended to be merely illustrative of possible embodiments of the invention, and not to limit the scope of the appended claims in any manner.

DETAILED DESCRIPTION OF PREFERRED EMBODIMENTS OF THE INVENTION

Reference will now be made in detail to exemplary and presently preferred embodiments of the invention, illustrations of which are provided in the accompanying drawings. Whenever possible, the same reference numerals are used throughout the drawings to refer to the same or similar parts. The present invention is an optical fiber distribution enclosure, sometimes referred to as a fiber distribution hub (FDH), a fiber distribution terminal (FDT) or a local convergence cabinet (LCC), for use in the outside plant of a passive optical network (PON) as an interface between a service provider of broadband optical communications and multiple subscribers. The optical fiber distribution enclosure is operable for splitting an optical signal carried on an optical fiber of a feeder cable into multiple optical signals carried on a plurality of optical fibers of one or more distribution cables, and for interconnecting connectorized output optical fibers from at least one splitter module with the corresponding optical fibers of the distribution cable(s). As will be described in further detail hereinafter, an optical fiber distribution enclosure according to the invention is configured to receive a stubbed pre-connectorized feeder cable and a stubbed pre-connectorized distribution cable with organized cable routing and management and easy and ready access to the optical connections between the connectorized optical fibers of the distribution cable and the connectorized splitter output optical fibers. Furthermore, the optical fiber distribution enclosure facilitates factory assembly, field installation, initial configuration, reconfiguration and testing, and is scalable to accommodate an increasing number of optical connections as service is provided to additional subscribers. In a particular embodiment, the optical fiber distribution enclosure is a below grade closure for use in a buried optical network to provide centralized splitting in a high density, environmentally sealed enclosure.

Referring now to the accompanying drawings, in one aspect the present invention is an optical fiber distribution enclosure for splitting an optical signal carried on an optical fiber of a feeder cable into a plurality of optical signals carried on optical fibers of one or more distribution cables, and for interconnecting a plurality of splitter output optical fibers with a corresponding plurality of optical fibers of the distribution cable. As shown and described herein, an optical fiber distribution enclosure according to the invention comprises a housing 10 defining an interior, generally indicated by reference numeral 12. The housing 10 comprises a base 11 and a cover 13. Preferably, the cover 13 sealingly engages the base 11 to protect the interior 12 of the housing 10 from adverse environmental effects, such as dirt, dust, moisture, and insect and rodent infestation. In a preferred embodiment shown and described herein, the enclosure is a canister style below grade closure for use in a buried optical network. Such a below grade closure is disclosed in U.S. Pat. No. 6,778,752, which is assigned to the assignee of the present invention, wherein the base 11 of the housing 10 is an end cap and the cover 13 is a dome-shaped sleeve or hood. As shown, the end cap 11 and the hood 13 both have a cylindrical cross-section. However, as is well known in the art, the end cap 11 and the hood 13 may have any desired shape, such as square or rectangular. The housing 10 further comprises a frame 14 attached at one end to the end cap 11 and extending outwardly therefrom. The hood 13 fits over the frame 14 and is secured to the end cap 11 to protect the optical fibers and optical connections within the below grade closure 10 from adverse environmental effects, and to provide a relatively water-tight seal with the end cap. The frame 14 is made of a lightweight, yet structurally rigid material, such as metal (e.g., aluminum), plastic, or thermoplastic. The end cap 11 and the hood 13 are each made of a lightweight, yet rigid material, such as plastic, thermoplastic, or a composite (e.g., fiber and resin) material. The frame 14 is generally elongate such that the housing 10 of the below grade closure defines a longitudinal axis, indicated generally by reference numeral 15. The frame 14 is provided with a plurality of mounting surfaces and openings for receiving and/or supporting optical fiber routing, optical fiber and connector storage, optical fiber splitting and optical fiber connection components within the enclosure.

In general, and as will be described in greater detail below, the enclosure comprises at least two, and preferably three, separate and vertically arranged primary areas of optical fiber functionality; namely, at least one fiber distribution (i.e., connection) area; a signal splitting area; and a fiber parking area. Each of the areas is arranged vertically within the interior 12 of the distribution enclosure in a space-saving manner. With regard to the preferred embodiments shown and described herein, a signal splitting area 30 is disposed in a center portion of the interior 12 between a first fiber distribution area 20 disposed in an upper portion of the interior and a second fiber distribution area 40 disposed in a lower portion of the interior. A fiber parking area 50 is preferably located adjacent the second fiber distribution area 40 in the lower portion of the interior 12 between the base 11 and the second fiber distribution area. The optical fiber distribution enclosure further comprises an input fiber distribution area 60 for interconnecting an optical fiber of the feeder cable with a splitter input optical fiber, as will be described. As shown, the input fiber distribution area 60 is disposed immediately adjacent the second fiber distribution area 40 in the lower portion of the interior 12 between the fiber parking area 50 and the second fiber distribution area. However, the input fiber distribution area 60 may be disposed at any convenient location within the interior 12 of the enclosure without departing from the intended scope of the invention. For example, the input fiber distribution area 60 may be arranged vertically and disposed laterally adjacent the fiber parking area 50, the second fiber distribution area 40, the signal splitting area 30, or the first fiber distribution area 20. Furthermore, the locations of the first fiber distribution area 20 and the second fiber distribution area 40 may be reversed (i.e. interchanged). Likewise, the location of the fiber parking area 50 shown herein may be interchanged with the location of the input fiber distribution area 60.

The configuration of the optical fiber distribution enclosure depicted herein is believed to be most advantageous since the location of the signal splitting area 30 relative to the locations of the first and second fiber distribution areas 20, 40 optimizes fiber management and provides substantially unrestricted access to the splitter modules 34 mounted in the signal splitting area 30 as well as the fiber distribution fields 22, 42 defined by the fiber distribution areas 20, 40, respectively. In particular, the configuration shown and described herein permits the use of splitter modules 34 having a plurality of pre-connectorized splitter output fibers 38 having the same predetermined length. In other words, the splitter output fibers 38 are single-length pigtails. Although not shown herein, a front portion of the cover 13 may be openable or removable to provide access to the signal splitting area 30 and the fiber distribution areas 20, 40 once the enclosure is assembled without removing the cover from the base 11 so as to avoid breaking the sealing engagement between the cover and the base. However, any such "access door" must sealingly engage the cover 13 if the enclosure is a below grade closure for use in a buried optical network. Once the enclosure is assembled and installed, a field technician from the service provider need only remove the cover 11 or open the access door on the front portion of the cover in order to establish additional service connections or to reconfigure existing service connections.

Figure 1:
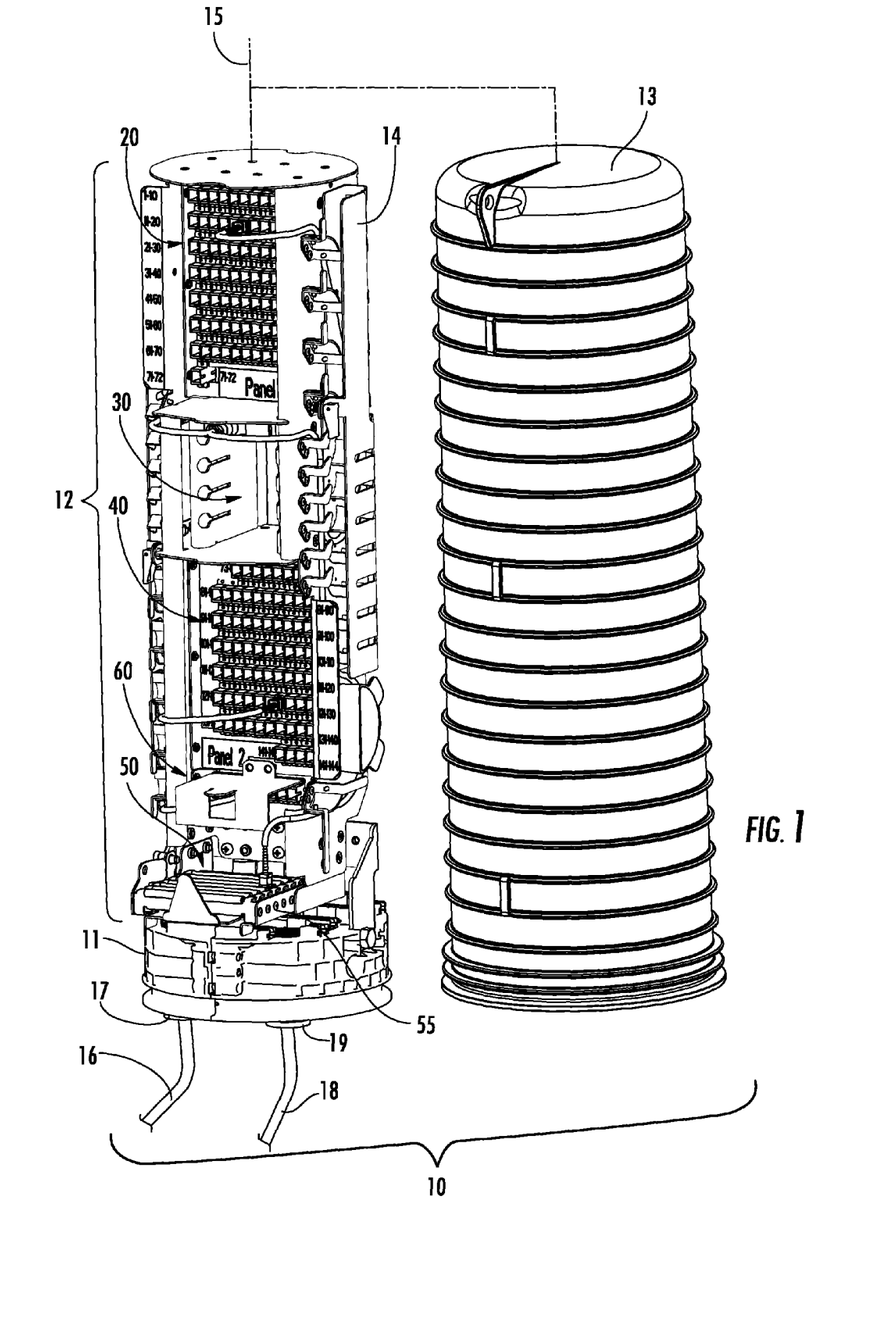
FIG. 1 is a perspective view of an optical fiber distribution enclosure arranged and configured in accordance with the present invention and shown with the cover removed for purposes of clarity.
Figure 4:
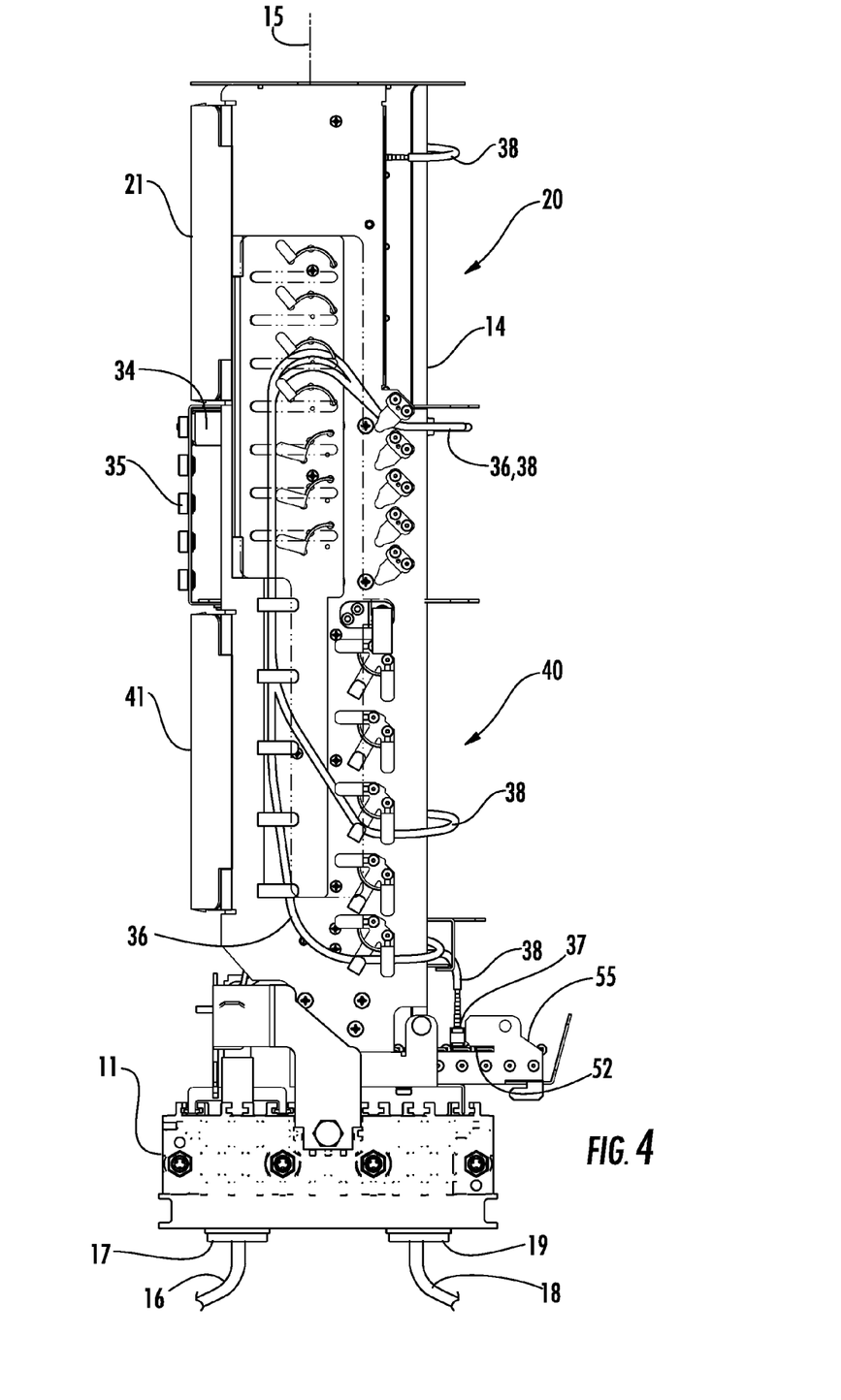
FIG. 4 is a left side view of the optical fiber distribution enclosure of FIG. 1 without the cover.
Figure 5:
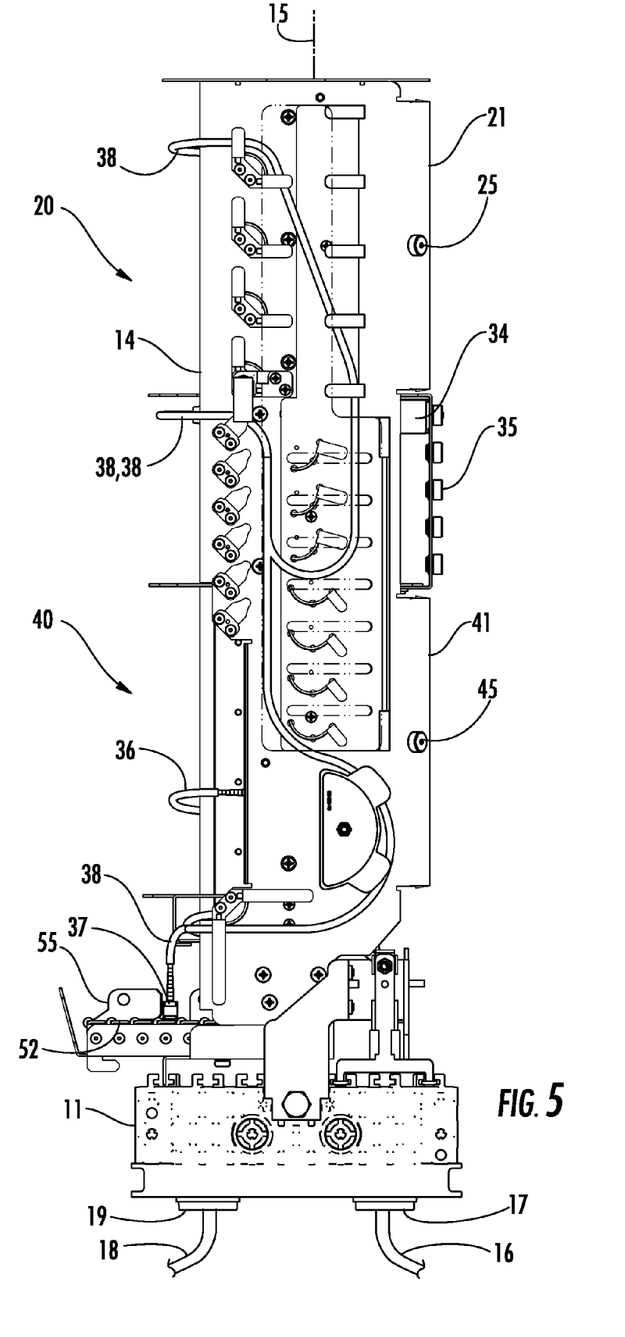
FIG. 5 is a right side view of the optical fiber distribution enclosure of FIG. 1 without the cover.
Figure 6:
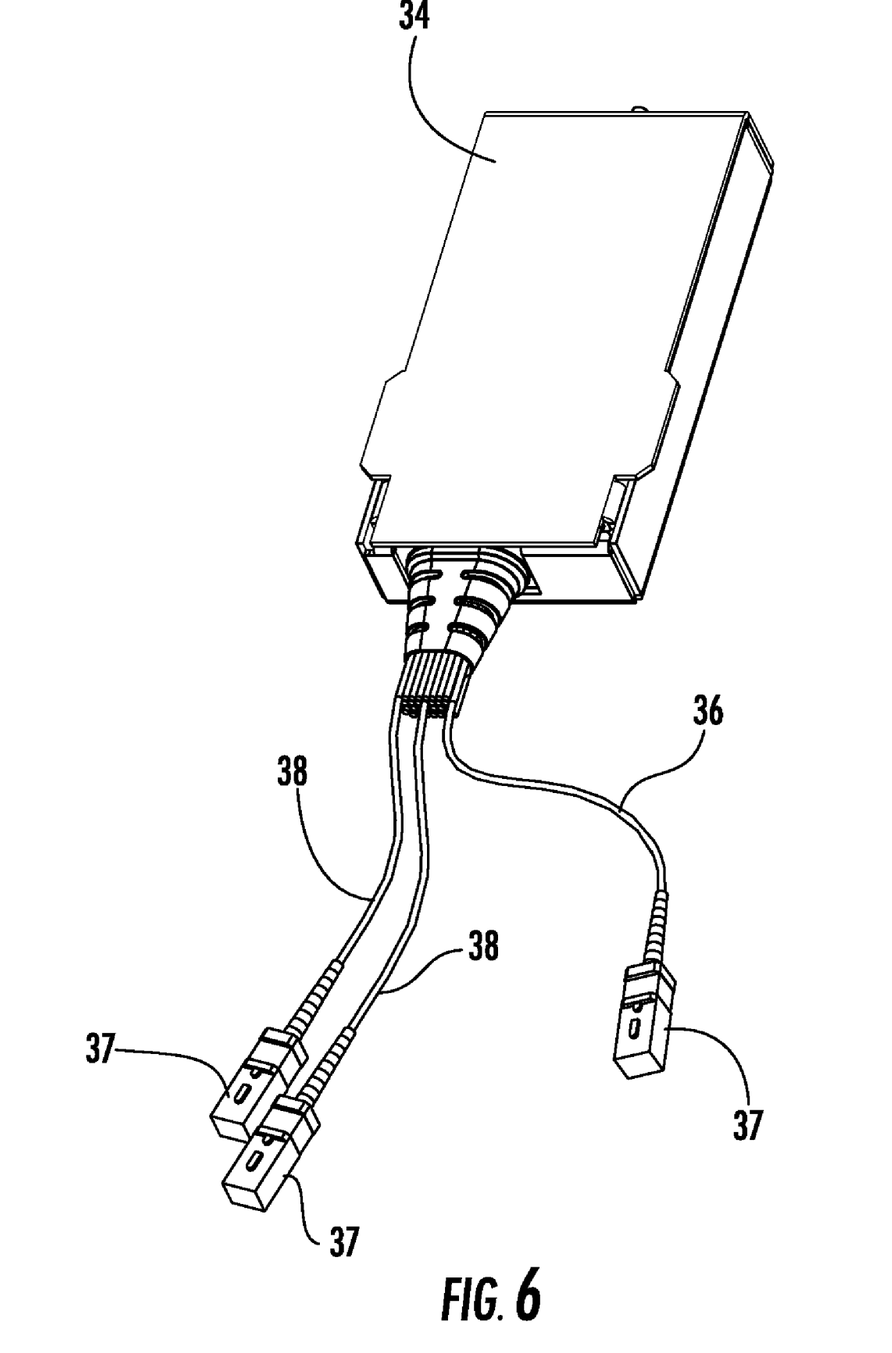
FIG. 6 is a perspective view of a typical 1×32 splitter module for mounting in the signal splitting area of the optical fiber distribution enclosure of FIG. 1 showing the pre-connectorized ends of the splitter input optical fiber and the splitter output optical fibers in greater detail.

A preferred embodiment of an optical fiber distribution enclosure according to the invention is shown in FIGS. 1-5. FIG. 1 is a perspective view of the enclosure with the cover 13 removed from the base 11 for purposes of clarity. FIGS. 2-5 are front, rear, left side and right side views, respectively, of the enclosure without the cover 13. A typical splitter module 34 suitable for use with the optical fiber distribution enclosure of the invention is shown in FIG. 6. As previously mentioned, the interior 12 defined by the housing 10 of the enclosure is configured with at least three separate, vertically arranged areas 20, 30, 40 with the signal splitting area 30 medially disposed between the first fiber distribution area 20 and the second fiber distribution area 40. For purposes of this detailed description, the interior 12 is divided into a front, a rear, a left side and a right side depicted in FIGS. 2-5, respectively, that correspond to the front, rear, left side and right side of the frame 14. The signal splitting area 30 comprises a splitter module compartment 32 for receiving and storing splitter modules 34. The splitter module compartment 32 preferably opens to the front of the interior 12 so that the splitter modules 34 can be readily installed and the splitter output optical fibers 38 easily routed to the fiber distribution areas 20, 40 or the parking area 50, as will be described, and the splitter input optical fibers 36 easily routed to the input fiber distribution area 60, as will be described. The fiber distribution fields 22, 42 defined by the first and second fiber distribution areas 20, 40, respectively, are operable for interconnecting the splitter output optical fibers 38 with corresponding optical fibers 18a of the distribution cable, as will be described. The fiber parking area 50 defines a fiber parking field 52 for storing at least one splitter output optical fiber 38 that is not routed to the first fiber distribution area 20 or the second fiber distribution area 40, as will be described. The input fiber distribution area 60 defines an input fiber distribution field 62 for interconnecting at least one splitter input optical fiber 36 with an optical fiber of the feeder cable, as will be described. The areas 20, 30, 40, 50, 60 may be positioned within the interior 12 in any suitable arrangement, and in particular as depicted herein, that provides the optical fiber routing, management and connection functionality required of a high density optical fiber distribution enclosure for use in the outside plant of a PON.

Figure 2:
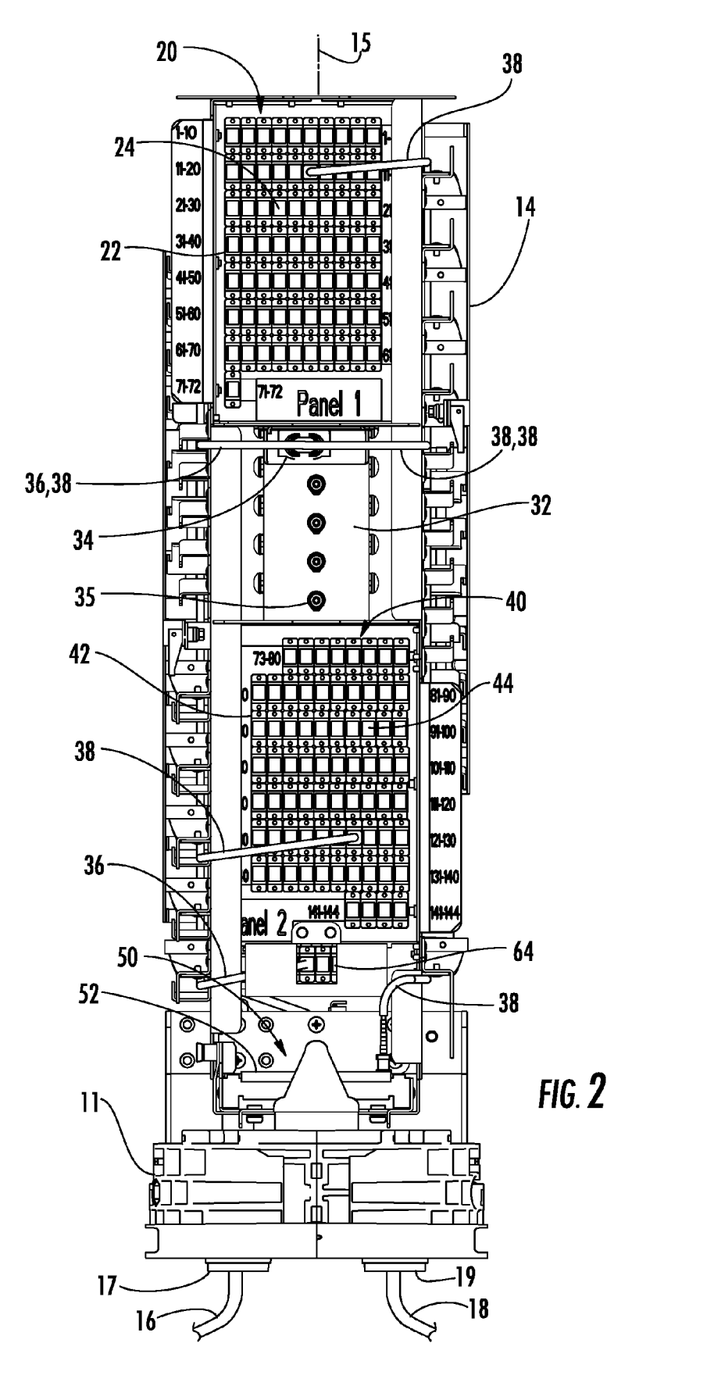
FIG. 2 is a front view of the optical fiber distribution enclosure of FIG. 1 without the cover.
Figure 3:
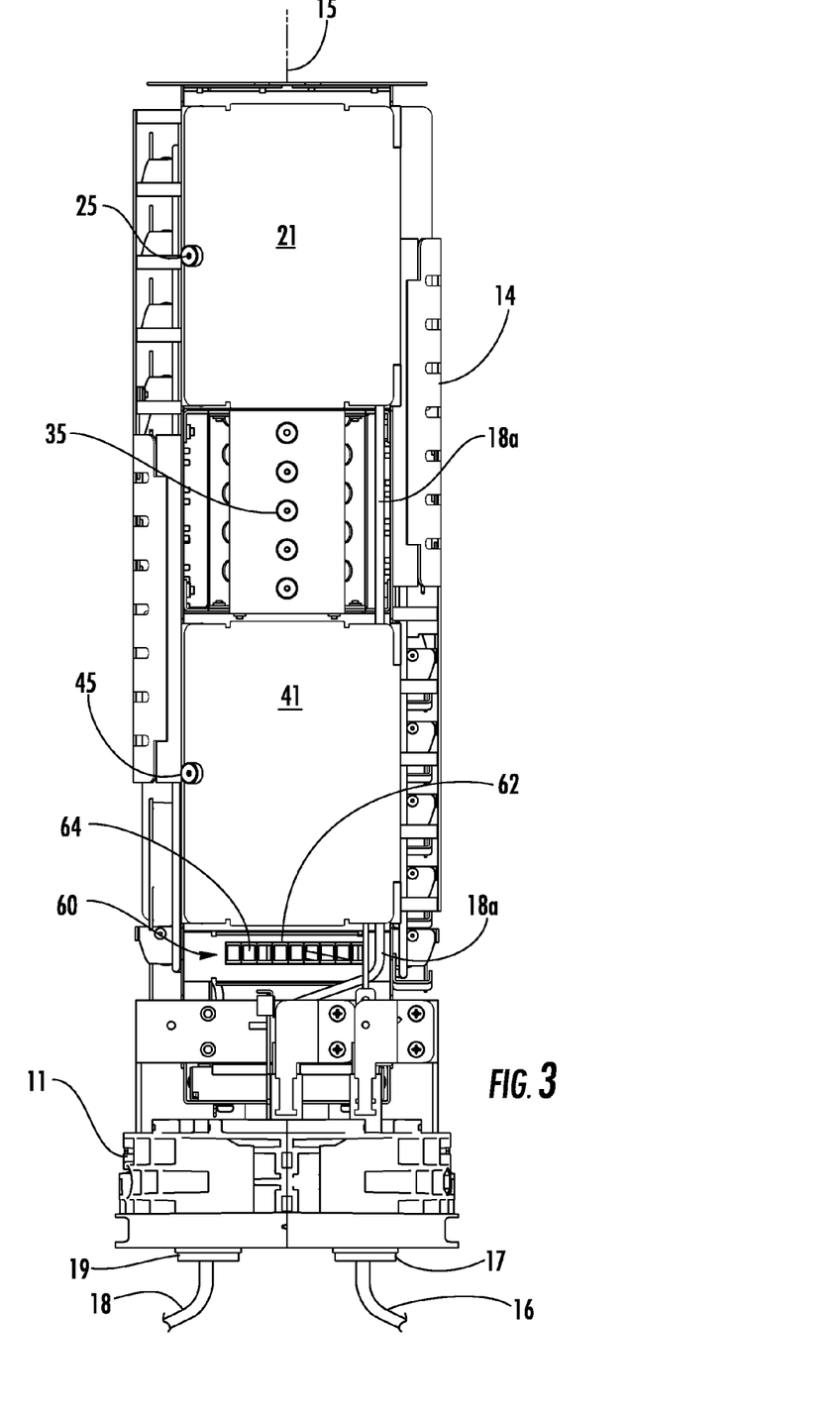
FIG. 3 is a rear view of the optical fiber distribution enclosure of FIG. 1 without the cover.

Referring generally to FIGS. 2-5, and more specifically to FIG. 3, a feeder cable 16 of a PON belonging to a service provider of broadband optical communications enters the enclosure via a feeder cable port 17 opening through the base 11. The location of the feeder cable port 17 is shown for convenience only, and if desired, the port may be formed at any location opening through the base 11, for example at the center of the base coincident with the longitudinal axis 15, or even through the outer periphery of the base. The location of the feeder cable port 17 is typically selected to provide unrestricted and optimal routing of the optical fibers of the feeder cable 16 to the input fiber distribution area 60. Regardless, the feeder cable 16 is a pre-connectorized stub cable having a plurality of connectorized optical fibers at one end for factory installation into the optical fiber distribution enclosure. The feeder cable 16 has bare optical fibers at the other end for connecting in any suitable manner, for example by fusion splicing, to optical fibers of a main feeder cable extending to the enclosure from an upstream link in the PON, such as a central office. The feeder cable 16 passes through the feeder cable port 17 and into an epoxy furcation plug (not shown) that separates the optical fibers of the feeder cable into relatively short lengths of 900 micron jacketed or buffered optical fibers having a connector mounted upon the end. Similarly, at least one distribution cable 18 enters the enclosure via a distribution cable port 19 opening through the base 11. The location of the distribution cable port 19 is shown for convenience only, and may be formed at any location opening through the base 11. The location of the distribution cable port 19 is typically selected to provide unrestricted and optimal routing of the optical fibers of the distribution cable 18 to the fiber distribution areas 20, 40. Regardless, the distribution cable 18 is a pre-connectorized stub cable having a plurality of connectorized optical fibers 18a at one end for factory installation into the optical fiber distribution enclosure. The distribution cable 18 has bare optical fibers at the other end for connecting in any suitable manner, for example by fusion splicing, to optical fibers of one or more branch or distribution cables extending towards subscribers downstream from the enclosure in the outside plant of the PON.

In a particular example, the stubbed feeder cable 16 comprises twelve (12) individual optical fibers arranged in a single buffer tube and the stubbed distribution cable 18 comprises 144 individual optical fibers arranged in a plurality of buffer tubes. The distribution cable 18 passes through the distribution cable port 19 and into at least one epoxy furcation plug (not shown) that separates the optical fibers of the distribution cable within each buffer tube into a plurality of longer lengths of 900 micron jacketed or buffered optical fibers having a connector mounted upon the end. The connectors mounted on the ends of the optical fibers of the stubbed feeder cable 16 and the stubbed distribution cable 18 may be any suitable single fiber connector type, such as SC, FC, ST, LC, etc. As shown herein, the connectors are SC type connectors. However, LC type connectors may be used to further increase the density of the optical connections within the interior 12 of the enclosure. Furthermore, the feeder cable 16 and the distribution cable 18 are preferably sealed within the feeder cable port 17 and the distribution cable port 19, respectively, from adverse environmental effects by a conventional grommet, gasket, gel or other sealing material (not shown) in a known manner. A conventional strain relief bracket (not shown) may also be provided for securing the outer sheath or jacket of each cable 16, 18 to the base 11 or to the frame 14 in a known manner so as to strain relieve the cable to the enclosure. A typical one of the optical fibers 18a (i.e. connectorized 900 micron jacketed or buffered optical fiber) of the distribution cable 18 is best shown in FIG. 3 being routed from the distribution cable port 19 through the base 11 to the rear of the fiber distribution field 22 defined by the first fiber distribution area 20. A typical one of the connectorized optical fibers of the feeder cable 16 is not shown for purposes of clarity.

As best shown in FIG. 2, the fiber distribution fields 22, 42 defined by the fiber distribution areas 20, 40 each comprise a conventional connector panel, also referred to in the art as an "adapter panel" or "patch panel." Each connector panel houses a plurality of fiber optic adapters 24, 44 arranged on the panel for interconnecting an opposing pair of connectorized optical fibers. Generally, each of the connectorized optical fibers 18a of the distribution cable 18 is routed to a fiber distribution field 22, 42 of one of the fiber distribution areas 20, 40 and inserted into the rear of a fiber optic adapter 24, 44 on the respective connector panel during factory assembly of the optical fiber distribution enclosure. As shown in FIG. 3, the enclosure comprises on the rear a first access door 21 and a second access door 41 for protecting the optical fibers of the distribution cable following installation and assembly in the factory. Access doors 21, 41 may be provided with a service provider security fastener 25, 45 in a known manner to prevent unauthorized access to the connectorized ends of the optical fibers 18a of the distribution cable 18 following installation and assembly. The frame 14 is preferably provided with any fiber routing guides or hubs necessary to ensure that the connectorized optical fibers 18a of the distribution cable 18 are routed to the appropriate fiber optic adapter 24, 44, and that any slack optical fiber is efficiently managed within the interior 12 of the enclosure. As best shown in FIG. 3, at least one, and preferably all, of the connectorized optical fibers of the feeder cable 16 are routed to the input fiber distribution field 62 defined by the input fiber distribution area 60 and inserted into the rear of a fiber optic adapter 64 provided on an associated connector panel during factory assembly of the optical fiber distribution enclosure. Likewise, the frame 14 may be provided with any fiber routing guides or hubs necessary to ensure that the connectorized optical fibers of the feeder cable 16 are routed to the appropriate fiber optic adapter 64, and that any slack optical fiber is efficiently managed within the interior 12 of the enclosure.

As will be best understood from FIG. 2, optical fibers 1-72 of the connectorized optical fibers 18a of the distribution cable 18 are routed along the frame 14 to the fiber optic adapters 24 provided in the fiber distribution field 22 of the first fiber distribution area 20. Accordingly, optical fibers 73-144 of the connectorized optical fibers 18a of the distribution cable 18 are routed along the frame 14 to the fiber optic adapters 44 provided in the fiber distribution field 42 of the second fiber distribution area 40. As previously mentioned, any desired number of connectorized optical fibers of the feeder cable 16 are routed directly to the fiber optic adapters 64 provided in the input fiber distribution field 62 of the input fiber distribution field 60. The remaining optical fibers of the feeder cable may be utilized as spares or may be routed back outside the enclosure as "express" optical fibers for connection further downstream in the outside plant of the PON. Once the fiber optic adapters 24, 44 on the rear sides of the connector panels in the fiber distribution fields 22, 42 are fully populated with the connectorized optical fibers 18a of the distribution cable 18, the access doors 21, 41 can be secured. And once the fiber optic adapters 64 on the rear side of the connector panel provided in the input fiber distribution field 62 of the input fiber distribution area 60 are populated with the desired number of connectorized optical fibers of the feeder cable 16, the cover 13 is sealingly engaged with the base 11. It should be noted, however, that the optical fibers of the feeder cable 16 may be assembled (i.e., loaded) into the fiber optic adapters 64 before the optical fibers 18a of the distribution cable 18 are loaded into the fiber optic adapters 24, 44 without departing from the intended scope of the present invention. The enclosure can then be shipped to the service provider for installation (also referred to in the art as "deployment") in the outside plant of the PON.

As shown, at least one splitter module 34 may be mounted in the splitter module compartment 32 of the signal splitting area 30 in the factory and shipped with the pre-assembled enclosure. The splitter module 34 may be any type of signal splitting device configured for mounting in the splitter module compartment 32 of the signal splitting area 30 having at least one pre-connectorized splitter input optical fiber 36 and a plurality of pre-connectorized splitter output optical fibers 38. For example, the splitter module 34 may be a conventional 1×32 optical splitter having a single connectorized input optical fiber 36 and 32 connectorized output optical fibers 38. Alternatively, the splitter module 34 may be a conventional 1×16 or 2×16 optical splitter having the appropriate number of connectorized input optical fibers 36 and output optical fibers 38. For purposes of the present description, the splitter module 34 is shown in FIG. 6 as being a 1×32 optical splitter of the type commercially available from Corning Cable Systems LLC of Hickory, N.C. Thus, the splitter module 34 has a single connectorized splitter input optical fiber 36 and a total of 32 individual connectorized splitter output optical fibers 38, only two of which are illustrated in FIG. 6 for purposes of clarity. Because the splitter input and output optical fibers 36, 38 are pre-connectorized, assembly (in the factory) and installation (in the field) of the splitter optical connections can be made without splicing or direct connectorizing any of the optical fibers. As a result, assembly and installation of the optical fiber distribution enclosure, including assembly of the optical fibers of the stubbed pre-connectorized feeder cable 16 and distribution cable 18, are entirely "plug-and-play," thereby significantly reducing both materials and labor cost.

Furthermore, the jacketed or buffered input and output optical fibers 36, 38 of the splitter module 34 may comprise bend insensitive optical fiber (also referred to in the art as bend optimized or reduced bend optical fiber). As a result, the density of the optical connections within the enclosure can be further increased, or the size of the enclosure further reduced, due to the ability of the splitter input and output optical fibers 36, 38 to be routed around and over routing guides and hubs on the frame 14 having a smaller radius of curvature. Likewise, the optical fibers of the feeder cable 16 and the optical fibers 18a of the distribution cable 18 may comprise bend insensitive optical fiber in order to further increase the density of the optical connections or the further reduce the size of the enclosure. Because the splitter modules 34 are centrally located between the fiber distribution field 22 of the first fiber distribution area 20 and the fiber distribution field 42 of the second fiber distribution field 40, the splitter input and output optical fibers 36, 38 can each have the same length, thereby resulting in further reduced material and labor costs. As shown, the splitter module compartment 32 is configured to receive and secure up to five (5) splitter modules 34 vertically arranged in a centrally located column. However, the splitter module compartment 32 may be configured to receive and secure any desired number of splitter modules 34 in any desired arrangement. For example, the splitter module compartment 32 may be configured to receive and secure twelve (12) splitter modules 34 vertically arranged in two laterally adjacent columns of six (6) splitter modules 34. As best shown in FIG. 2 and FIG. 3, the frame 14 is provided with a plurality of captive nuts 35, each for engaging a threaded stud mounted on the rearward side of the splitter module 34. As a result, a splitter module 34 can be easily and readily added or removed from the enclosure in the factory during initial assembly or in the field during initial installation or reconfiguration.

If a splitter module 34 is assembled in the factory and shipped with the enclosure, the connectorized splitter input optical fiber 36 (i.e., pigtail) is routed along the frame 14 to the front side of one of the fiber optic adapters 64 provided in the input fiber distribution field 62 of the input fiber distribution area 60. As best depicted in FIG. 2 and FIG. 4, the splitter input optical fiber 36 may be routed along the left side of the frame 14 to the input fiber distribution field 62. In this manner, the splitter input optical fiber 36 is interconnected with the optical fiber of the feeder cable 16 inserted into the rear side of the fiber optic adapter 64. As a result, the optical signal carried on the optical fiber of the feeder cable 16 is optically coupled to the input of the optical splitter array of the splitter module 34. The connectorized splitter output optical fibers 38 (i.e., pigtails) are initially routed along the frame 14 to the fiber parking field 52 defined by the fiber parking area 50. Only a typical one of the splitter output optical fibers 38 is shown herein routed to the fiber parking field 52 for purposes of clarity. As best depicted in FIG. 2 and FIG. 5, the typical splitter output optical fiber 38 may be routed along the right side of the frame 14 to the fiber parking field 52. The splitter output optical fiber 38 may be secured in the fiber parking field 52 in any suitable manner that temporarily holds the connectorized end of the optical fiber without subjecting the connector 37 to damage or degradation.

For example, the fiber parking field 52 may comprise a plurality of parallel strips or pads made of a deformable material, such as rubber. Alternatively, the fiber parking area 52 may comprise a plurality of fiber optic adapters having at least a front (top) side configured to receive the connector 37. The rear (bottom) side of the fiber optic adapters mounted in the fiber parking field 52 may be omitted, or may be replaced by a dust cap to protect the end face of the connector 37. Regardless, the fiber parking field 52 is movably mounted within the fiber parking area 50 relative to the frame 14 to provide improved access for inserting and removing the connectors 37 of the splitter output optical fibers 38. At least one of the first fiber distribution field 22 and the second fiber distribution field 42 defines a first plane that is generally parallel to the longitudinal axis 15 defined by the housing 10, and the fiber parking field 52 defines a second plane that is not generally parallel to the longitudinal axis. As shown, the fiber parking field 52 comprises a generally planar shelf or tray 55 that slidingly engages the frame 14 such that the fiber parking field 52 is movable in the direction of the second plane away from the frame. Alternatively, the tray 55 may rotatably engage the frame 14 such that the second plane defined by the fiber parking field 52 rotates away from the frame. In a preferred embodiment, the first plane defined by the fiber distribution field 22 or 42 and the second plane defined by the fiber parking field 52 are perpendicular to one another, and the fiber parking field 52 moves radially relative to the longitudinal axis 15. In both FIG. 4 and FIG. 5, the tray 55 is shown moved (i.e. slid) radially outwardly relative to the frame 14 to an extended position in a direction generally perpendicular to the longitudinal axis 15.

Once the optical fiber distribution enclosure is installed in the outside plant of the PON, the service provider may configure the optical connections between the splitter output optical fibers 38 and the optical fibers 18a of the distribution cable 18 in any desired manner. In order to establish or to reconfigure service to a subscriber, a field technician from the service provider removes a splitter output optical fiber 38 from the fiber parking field 52 and re-routes it to the fiber distribution field 22, 42 of one of the fiber distribution areas 20, 40. As best depicted in FIG. 2 and FIG. 5, one of the splitter output optical fibers 38 is routed from the splitter module 34 in the splitter module compartment 32 along the right side of the frame 14 to the first fiber distribution area 20.

The splitter output optical fiber 38 is routed onto the fiber distribution field 22 and inserted into the front side of a fiber optic adapter 24 located in position "16" of the connector panel (FIG. 2). In this manner, the splitter output optical fiber 38 is interconnected with the optical fiber 18a of the distribution cable 18 inserted into the rear side of the fiber optic adapter 24. As a result, the optical signal carried on the splitter output optical fiber 38 is transmitted to the corresponding optical fiber 18a of the distribution cable 18. It should be noted that position "72" of the connector panel (FIG. 2) in the first fiber distribution area 20 is not provided with a fiber optic adapter 24 merely for purposes of illustration.

As best depicted in FIG. 2 and FIG. 4, one of the splitter output optical fibers 38 is similarly routed from the splitter module 34 in the splitter module compartment 32 along the left side of the frame 14 to the second fiber distribution area 40. The splitter output optical fiber 38 is routed onto the fiber distribution field 42 and inserted into the front side of a fiber optic adapter 44 located in position "127" of the connector panel (FIG. 2). In this manner, the splitter output optical fiber 38 is interconnected with the optical fiber 18a of the distribution cable 18 inserted into the rear side of the fiber optic adapter 44. As a result, the optical signal carried on the splitter output optical fiber 38 is transmitted to the corresponding optical fiber 18a of the distribution cable 18. It should be noted that each of the positions "71" and "72" of the connector panel (FIG. 2) in the second fiber distribution area 40 is not provided with a fiber optic adapter 44 since those positions are provided with fiber optic adapters 24 located on the connector panel in the first fiber distribution area 20. Accordingly, in the exemplary embodiment shown and described herein fiber distribution field 22 comprises fiber optic adapters 24 located in distribution fiber positions "1-72" and fiber distribution field 42 comprises fiber optic adapters 44 located in distribution fiber positions "73-144." Obviously, the field technician may continue to re-route splitter output optical fibers 38 from the fiber parking field 52 to the fiber distribution fields 22, 42 until all of the splitter output optical fibers of the first splitter module 34 are interconnected with corresponding optical fibers 18a of the distribution cable 18. Thereafter, the field technician may install a second or subsequent splitter module 34 into the splitter module compartment 32 of the signal splitting area 30. The splitter output optical fibers 38 of the second or subsequent splitter module 34 not routed to one of the fiber distribution fields 22, 42 may be initially routed to the fiber parking field 52 defined by the fiber parking area 50, as previously described.

A particular advantage of the optical fiber distribution enclosure shown and described herein is the central location of the splitter modules 34 between the fiber distribution field 22 of the first fiber distribution area 20 and the fiber distribution field 42 of the second fiber distribution area 40. As such, the splitter modules 34 may be "universally" provided with single-length connectorized splitter input and output optical fibers 36, 38, thereby significantly reducing material cost and labor cost to assemble and install the splitter modules 34 into the enclosure. Another particular advantage of the optical fiber distribution enclosure of the present invention is that the fiber parking field 52 is movable relative to the frame 14, and in particular relative to the fiber distribution fields 22, 42 to provide improved access for inserting and removing connectors 37 of the splitter output optical fibers 38. Yet another particular advantage of the optical fiber distribution enclosure is that the stubbed feeder cable 16, the stubbed distribution cable 18 and the input and output optical fibers 36, 38 of the splitter modules 34 are all pre-connectorized so that the assembly and installation of the optical connections is entirely "plug-and-play," thereby further reducing material and labor costs. Yet another particular advantage of the optical fiber distribution enclosure is that at least the splitter input and output optical fibers 36, 38 preferably comprise bend insensitive optical fiber, thereby further increasing the density of the optical connections within the enclosure or reducing the size of the enclosure. Finally, in a particular embodiment, the optical fiber distribution enclosure of the present invention provides the functionality of a fiber distribution hub (FDH), fiber distribution terminal (FDT) or local convergence cabinet (LCC) in an environmentally sealed below grade closure for use in the outside plant of a buried optical network.

It will be immediately apparent to those skilled in the art that modifications and variations can be made to the present invention without departing from the intended spirit and scope of the invention. Thus, it is intended that the present invention cover all conceivable modifications and variations of the invention described herein and shown in the accompanying drawings, provided those alternative embodiments come within the scope of the appended claims and their equivalents.

That which is claimed is:

1. An optical fiber distribution enclosure for splitting an optical signal carried on at least one optical fiber of a feeder cable into multiple optical signals carried on a plurality of optical fibers of a distribution cable, the enclosure comprising:
   a housing defining an interior;
   a first fiber distribution area disposed within an upper portion of the interior;
   a second fiber distribution area disposed within a lower portion of the interior; and
   a signal splitting area disposed within a center portion of the interior between the upper portion and the lower portion, the signal splitting area comprising at least one splitter module configured for splitting an optical signal carried on at least one splitter input optical fiber into a plurality of optical signals carried on a corresponding plurality of splitter output optical fibers;
   wherein the first fiber distribution area and the second fiber distribution area each comprise a fiber distribution field for optically connecting at least one splitter output optical fiber with a corresponding one of the plurality of optical fibers of the distribution cable.

2. An optical fiber distribution enclosure according to claim 1 further comprising a fiber parking area comprising a parking field for storing at least one splitter output optical fiber that is not routed to the first fiber distribution area or the second fiber distribution area.

3. An optical fiber distribution enclosure according to claim 2 wherein the housing defines a longitudinal axis and wherein the fiber distribution field of each of the first fiber distribution area and the second fiber distribution area defines a first plane generally parallel to the longitudinal axis and the fiber parking field of the fiber parking area defines a second plane not generally parallel to the longitudinal axis.

4. An optical fiber distribution enclosure according to claim 3 wherein the fiber parking field is movable relative to the fiber distribution field of each of the first fiber distribution area and the second fiber distribution area to provide increased access to the fiber parking field.

5. An optical fiber distribution enclosure according to claim 4 wherein the fiber parking field is movable in the direction of the second plane.

6. An optical fiber distribution enclosure according to claim 2 wherein the fiber parking area is disposed within the lower portion of the interior of the housing adjacent the second fiber distribution area.

7. An optical fiber distribution enclosure according to claim 1 further comprising an input fiber distribution area for optically connecting the at least one splitter input fiber with the at least one optical fiber of the feeder cable.

8. An optical fiber distribution enclosure according to claim 7 wherein the input fiber distribution area is disposed within the interior of the housing adjacent the lower portion.

9. An optical fiber distribution enclosure according to claim 1 wherein each of the splitter output optical fibers is a pre-connectorized pigtail comprising a bend insensitive optical fiber and having a predetermined length.

10. An optical fiber distribution enclosure according to claim 1 wherein the housing comprises a base and a cover that sealingly engages the base to protect the interior of the housing from adverse environmental effects.

11. An optical fiber distribution enclosure according to claim 1 wherein the housing is a below grade closure for use in a buried optical network.

12. An optical fiber distribution enclosure comprising:
   a housing defining an interior and a longitudinal axis;
   a first fiber distribution area disposed within the interior of the housing and comprising a first fiber distribution field for optically connecting at least one of a plurality of splitter output optical fibers with a corresponding one of a plurality of optical fibers of a distribution cable, the fiber distribution field defining a first plane generally parallel to the longitudinal axis; and
   a fiber parking area disposed within the interior of the housing and comprising a fiber parking field for storing at least one unused splitter output optical fiber, the fiber parking field defining a second plane that is not generally parallel to the longitudinal axis.

13. An optical fiber distribution enclosure according to claim 12 further comprising:
   a second fiber distribution area disposed within the interior of the housing and comprising a second fiber distribution field for optically connecting at least one of the plurality of splitter output optical fibers with at a corresponding one of the plurality of optical fibers of the distribution cable; and
   a signal splitting area disposed within the interior of the housing and comprising at least one splitter module for splitting an optical signal carried on at least one optical fiber of a feeder cable into a plurality of optical signals carried on a plurality of the splitter output optical fibers;
   wherein the signal splitting area is disposed medially between the first fiber distribution field and the second fiber distribution field.

14. An optical fiber distribution enclosure according to claim 13 wherein each of the splitter output optical fibers is a pre-connectorized pigtail having a predetermined length.

15. An optical fiber distribution enclosure according to claim 12 wherein the fiber parking field is movable relative to the first fiber distribution field of the first fiber distribution area in the direction of the second plane to provide increased access to the fiber parking field.

16. An optical fiber distribution enclosure according to claim 13 further comprising an input fiber distribution area for optically connecting at least one splitter input fiber with the at least one optical fiber of the feeder cable.

17. An optical fiber distribution enclosure according to claim 12 wherein the housing comprises a base and a cover that sealingly engages the base to protect the interior of the housing from adverse environmental effects.

18. A closure for providing centralized splitting in an optical network, the closure comprising:

- a base;
- a frame mounted on the base;
- a cover enclosing the frame and in sealing engagement with the base to define an environmentally protected interior;
- a signal splitting area disposed on the frame within the interior and comprising at least one splitter module for splitting an optical signal carried on at least one optical fiber of a feeder cable into a plurality of optical signals carried on a plurality of splitter output optical fibers; and
- a first fiber distribution area disposed on the frame within the interior and comprising a first fiber distribution field for optically connecting at least one of the plurality of splitter output fibers with a corresponding one of a plurality of optical fibers of a distribution cable.

19. A closure according to claim 18 further comprising:

- a second fiber distribution area disposed on the frame within the interior and comprising a second fiber distribution field for optically connecting at least one of the plurality of splitter output fibers with a corresponding one of the plurality of optical fibers of the distribution cable;
- wherein the signal splitting area is disposed medially between the first fiber distribution area and the second fiber distribution area; and
- wherein each of the splitter output optical fibers is a pre-connectorized pigtail having a predetermined length.

20. A closure according to claim 18 further comprising:

- a fiber parking area disposed on the frame within the interior and comprising a fiber parking field for storing at least one unused splitter output fiber;
- wherein the first fiber distribution field of the first fiber distribution area defines a first plane; and
- wherein the fiber parking field defines a second plane that is not parallel to the first plane.

* * * * *